Patented Jan. 2, 1934

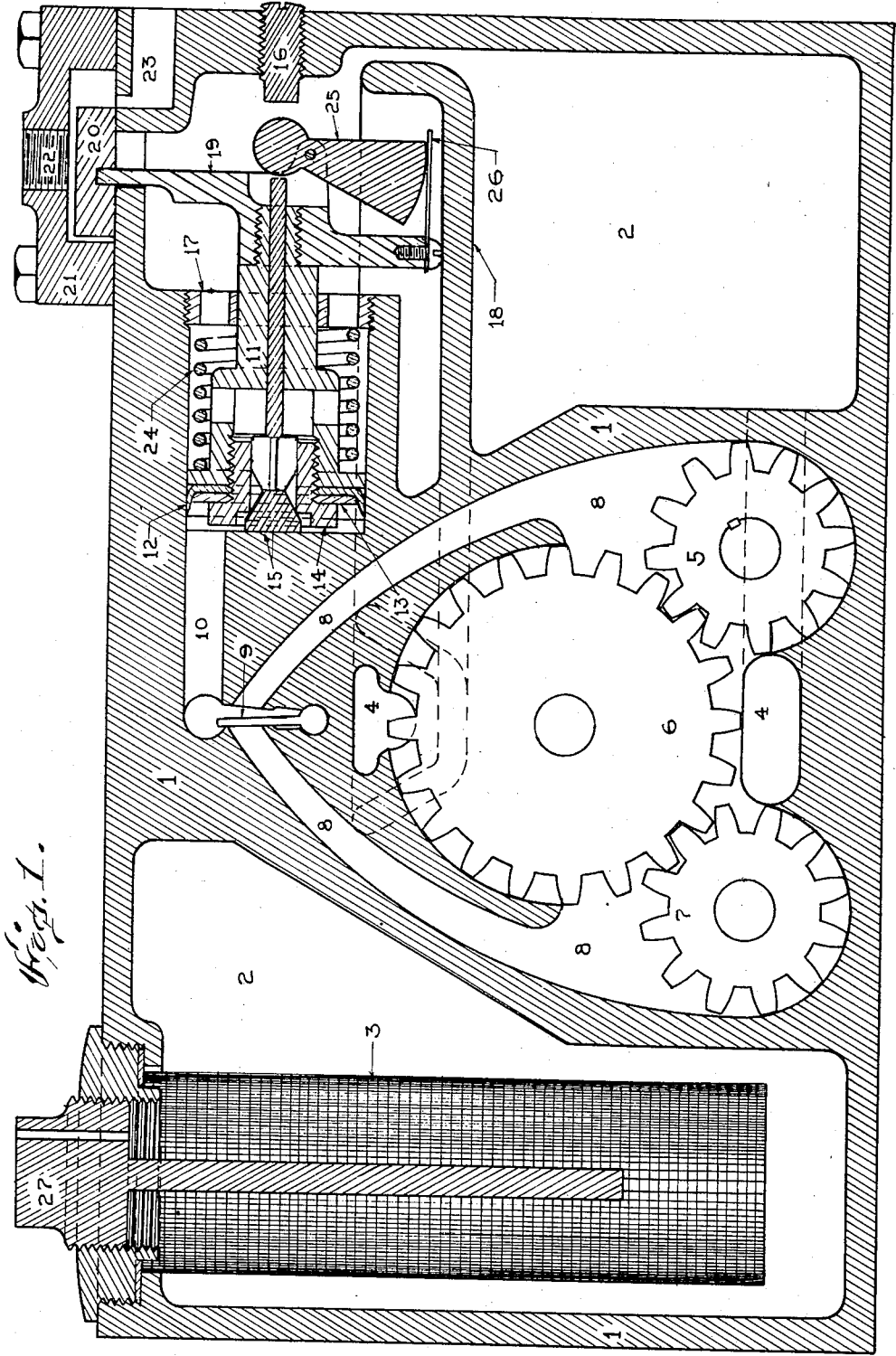

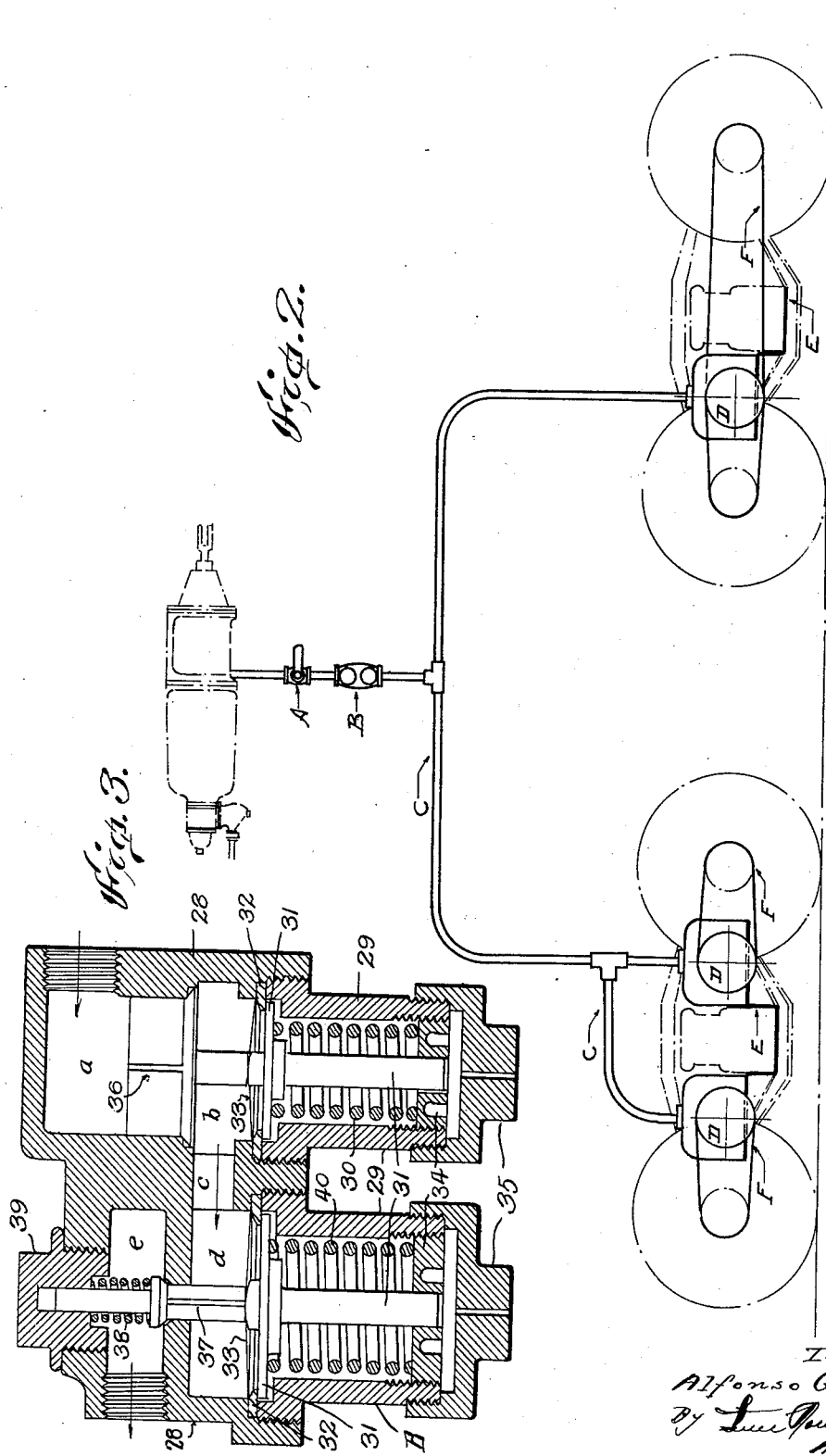

1,941,857

UNITED STATES PATENT OFFICE 1,941,857

ANTISKID DEVICE FOR CAR WHEELS

Alfonso Garcia, Mexico, Mexico

Application November 22, 1932, Serial No. 643,929, and in Mexico December 22, 1931

9 Claims. (Cl. 303—21)

This invention relates to an apparatus for avoiding skidding or sliding of the wheels of vehicles when air brakes are used on said wheels.

The object of the invention is to provide an apparatus which will avoid the skidding of vehicle wheels when air brakes are applied to them with some force.

The apparatus according to the present invention is illustrated in the accompanying drawings, in which:

Fig. 1 is a diagrammatical view of the apparatus showing the different parts of which it is composed.

Fig. 2 shows the apparatus placed on the trucks of a car with four pairs of wheels. In the truck on the right hand side the apparatus are placed together in one single piece and connected separately by means of a band to the shaft of the pair of wheels which they are to govern; in the truck on the left hand side the apparatus are placed individually and connected also with a band to their corresponding pair of wheels.

The object of Fig. 2 is to show how the apparatus are placed either together or separately. The number of pairs of wheels on a car is of no importance.

Fig. 3 is a detailed sectional view of the high and low pressure valve B.

With reference to Fig. 1, 1 is the body of the apparatus in which are placed all the several parts of same. This body is provided with a reservoir 2 for receiving oil, 3 is a strainer of wire net, 4 are passages by which the oil may pass from the reservoir to the passages 8. 5, 6 and 7 are three gears. 9 is an oscillatory valve and 10 is a discharge passage. 11 is a piston with leather packing 12 held in place by the washer 13 and the nut 14. This nut 14 also serves as a seat for the relief valve 15. 16 is a stop for the governor of the relief valve. 17 is a washer having a hole for the passage of the rod of the piston and other holes for the passage of the excess oil. 18 is a tray for holding part of the oil which is discharged through the cylinder of the piston. A projection 19 in which is inserted the governor of the relief valve has two projections of which one moves the slide valve 20 while the other serves as a support for the spring 26. 21 is the cover for the slide valve 20 and has an admission passage 22. 23 is an atmospheric outlet port; 24 is a spring which compresses the piston. 25 is a governor to hold the relief valve. The spring 26 will maintain the governor in any desired position. 27 is a plug in the oil reservoir. Said plug is provided with a rod for measuring the oil contents and is also provided with a relief port for avoiding accumulation of pressure. The object of the aforementioned pieces is the following:

When the oil reservoir 2 is full of oil, this will flow through the conduits 4 and will fill the chamber of the gears 5, 6 and 7. These three gears form together a pump which will work effectively in any direction in which the gears are turned. The gear 5 is connected to a pulley which moves it, and when the gear 5 rotates to the left it pumps together with gear 6 and when it rotates to the right the gears 6 and 7 will effect the pumping. The oil which is thus pumped passes through the conduct 8 in the corresponding side and through the oscillating valve 9, through conduit 10 to the cylinder of the piston 11 forcing same towards the right to the full extent of its stroke against the tension of the spring 24. By doing this the piston, on the extreme of which is found the projection 19, will move the slide valve 20 by means of said projection, towards the right, whereby the discharge opening 23 will be closed and remain so during the time in which the pump works. When the piston 11 has completed its stroke to the right, the upper part of the governor will, when it strikes against the stop 16, cause the relief valve 15 to raise from its seat and thus allow the oil which has been continuously pumped to pass through said valve and through the holes made in the piston 11 and in the cover 17 to the tray 18 and to the reservoir 2, whereby the oil will only be circulated during the time in which the piston closes the outlet 23 by means of the slide valve 20. In these conditions the governor 25 with the pressure produced by the spring 26 will keep open the relief valve so that the oil which has collected at the bottom of the cylinder of the piston may pass therethrough when the pump does not work, so that the piston may return rapidly by means of the spring 24. When the head of the relief valve strikes against the bottom of the cylinder of the piston the spring 24 will overcome the friction of the spring against the governor and thus permit the relief valve to go back to its seat whereafter the apparatus is again ready for action.

When the pump is not working the spring 24 will force the piston 11 towards the left and moving with it the slide valve 20 again opening the outlet 23 to the atmosphere.

The tray 18 serves for receiving and storing part of the oil which circulates so that the gear 5 may always be fed with oil through the upper conduit 4 even when the quantity of oil in the reservoir be very small and consequently of low level.

The object of the apparatus according to the present invention is to control the movement of the wheels of a car and discharge into the atmosphere the air which is being used for the braking when the wheel to which the apparatus is connected begins to slide, stopping such discharge immediately when the wheel starts turning again. With the apparatus according to the present invention, the wheels will only be braked to the extent which will not stop the turning of the wheels. When the car is started the axles of the wheels, by means of a band, will make the gear pump rotate, and the pump will immediately pump the oil which is placed in the reservoir, and the oil will build up pressure on the piston of the apparatus which will be moved to the right carrying with it the slide valve which will close the outlet port of the apparatus to the air. Under these conditions, when the air brake is applied, the air coming from the cylinder of the brake of the car reaches the chamber via passage 22 of the sliding valve, but will not escape therefrom because the valve is blanking the outlet port. When one or several of the wheels of the car stop rotating due to excess application of air or due to defects in the mechanism, the pump will stop working, and as there is consequently no pressure of the oil against the piston, said piston will go back to its initial position due to the action of the spring 24 and also bring back to its initial position the slide valve which thus uncovers the outlet port so that the air may escape.

Hereby the brakes are loosened, and when the wheels begin to rotate again, starting the pump, the escape of the air through said outlet port is suspended and thereby is obtained a degree of braking which corresponds to the rotating capacity of the wheels.

The location of the apparatus and of the other pieces necessary for their application, is shown in Fig. 2, in which:

A is a cut-out cock; B is a valve of high and low pressure, C is an admission pipe; D is the apparatus according to the present invention which serves for one pair of wheels. E are the supports for the apparatus, and F are the bands for transmission. The object of the said pieces is the following:

The cut-out cock has for its object to cut-out the apparatus from the brake equipment in case the apparatus for one reason or another should fail to work, so that the brakes of the car may continue to work as if the apparatus were not applied. The valve of high and low pressure valve B has for its object to cut-out the apparatus from the brake equipment, in emergency cases and in cases where the application of the brakes is rather weak and when the pressure in the cylinder of the brake does not exceed 25 pounds, whereby the whole power of the brake may be obtained in emergency stops with low velocity. The admission pipe serves for connecting the brake cylinder with the anti-skid apparatus. The bands are for transmitting the movement of the wheels to the apparatus.

As shown in the drawings, valve B comprises a housing 28 and casings 29 for the springs 30 and 40. Diaphragms 33 are positioned in the housing by means of washers 32 and cooperate with spindles 31. The action of springs 30 and 40 is varied by means of adjusting nuts 34 threaded within the casings 29. Covers 35 are associated with said casings 29 to protect the spring adjustments against accidental displacement. Valve 36 controls the admission of air and valve 37 controls the discharge. A spring 38 positioned in cover 39 is associated with valve 37 and cooperates with regulating spring 40.

When applying the brakes of the train, the air from the cylinder of the brake reaches the chamber "a" above the admission valve 36; if pressure of the air is not sufficient to overcome the resistance of the regulating spring 30, it will remain in said chamber "a", thus cutting off the apparatus from the regular brake equipment when the application of the brakes is made with low pressure, that is, lower than the resistance of the regulator spring 30.

When the pressure of the air from the brake equipment is greater than that for which the resistance of the spring 30 is graduated, the excess of pressure will open the admission valve 36 downwardly keeping it in such position, thus allowing the air to pass from chamber "a" to chamber "b", through the conduct "c" to chamber "d" and through the seat of the valve 37 to the chamber "e" and finally to the apparatus according to the present invention, which under such circumstances are placed in communication with the cylinder of brake equipment and enabled to loosen the brakes when some of the wheels begin to skid.

When emergency applications are effected, the admission valve 36, its diaphragm and regulating spring 30, will function as described. In these cases the whole strength of the brake is obtained, and consequently the pressure of air in the cylinder of the brake and in the chambers "a", "b" and "d" is greater than that for which the regulating spring 40 has been graduated. This excess pressure on the upper face of the diaphragm will compress the regulating spring 40, whereafter the valve 37, by means of the spring 38, may fall into its seat and cut off the communication of the air between chambers "d" and "e", thus cutting off the apparatus from the regular brake equipment of the car.

The object of this valve, as has been seen, is to cut off the apparatus from the regular brake equipment during emergency applications and applications of low pressure, and connecting them under ordinary service applications.

Having thus described my invention, what I claim is:

1. An apparatus for avoiding skidding or sliding of car wheels controlled by air brakes, comprising a casing containing an oil reservoir and a pump chamber, a pump in said chamber for drawing oil from said reservoir and forcing it through a passage to one end of a cylinder, a piston in said cylinder, a spring for urging the piston toward the oil feed end of the cylinder, a piston rod attached to the piston and extending through the cylinder, a relief valve in said piston having a stem extending through said piston rod, means for opening the relief valve when the piston reaches the end of its stroke, means mounted on the end of the piston rod for actuating the slide of a slide valve for controlling the escape of air from a brake cylinder, and means mounted on the end of the piston rod for retaining the relief valve in open position until closed by return of the piston to its original position.

2. An apparatus for avoiding skidding or sliding of car wheels controlled by air brakes by releasing air from a brake cylinder when a wheel controlled thereby is stopped, comprising a valve for controlling the release of air from the brake cylinder, a cylinder, a piston slidably mounted therein, means carried by the piston for opening and closing said valve as the piston moves from one end of its travel to the other, an oil pump operated by the brake controlled wheel, a reservoir for supplying oil to said pump, the discharge of said pump being connected to said cylinder so that oil under pressure from said pump will move the piston to a position to close the air release valve, a relief valve in the head of said piston adapted to bleed a portion of the oil therethrough, means for opening the oil relief valve when the piston is in a position to close the air release valve, and means for returning the piston to a position to open the air release valve when the oil pressure drops due to stopping of the wheel driving the pump.

3. An apparatus for avoiding skidding or sliding of car wheels controlled by air brakes by releasing air from a brake cylinder when a wheel controlled thereby is stopped, comprising a valve for controlling the release of air from the brake cylinder, a cylinder, a piston slidably mounted therein, means carried by the piston for opening and closing said valve as the piston moves from one end of its travel to the other, an oil pump operated by the brake controlled wheel, a reservoir for supplying oil to said pump, the discharge of said pump being connected to said cylinder so that oil under pressure from said pump will move the piston to a position to close the air release valve, a relief valve in the head of said piston adapted to bleed a portion of the oil therethrough, means for opening the oil relief valve when the piston is in a position to close the air release valve, means for returning the piston to a position to open the air release valve when the oil pressure drops due to stopping of the wheel driving the pump, and means for retaining the oil relief valve in open position until the piston has reached the end of travel towards the position at which the air release valve is open.

4. An apparatus for avoiding skidding or sliding of car wheels controlled by air brakes by releasing air from a brake cylinder when a wheel controlled thereby is stopped, comprising a valve for controlling the release of air from the brake cylinder, a cylinder, a piston slidably mounted therein, means carried by the piston for opening and closing said valve as the piston moves from one end of its travel to the other, an oil pump operated by the brake controlled wheel, a reservoir for supplying oil to said pump, the discharge of said pump being connected to said cylinder so that oil under pressure from said pump will move the piston to a position to close the air release valve, a relief valve in the head of said piston adapted to bleed a portion of the oil therethrough, means for opening the oil relief valve when the piston is in a position to close the air release valve, means for returning the piston to a position to open the air release valve when the oil pressure drops due to stopping of the wheel driving the pump, and means for returning the oil bled through the oil relief valve to the reservoir.

5. An apparatus for avoiding skidding or sliding of car wheels controlled by air brakes by releasing air from a brake cylinder when a wheel controlled thereby is stopped, comprising a valve for controlling the release of air from the brake cylinder, a cylinder, a piston slidably mounted therein, means carried by the piston for opening and closing said valve as the piston moves from one end of its travel to the other, an oil pump operated by the brake controlled wheel, a reservoir for supplying oil to said pump, the discharge of said pump being connected to said cylinder so that oil under pressure from said pump will move the piston to a position to close the air release valve, a relief valve in the head of said piston adapted to bleed a portion of the oil therethrough, means for opening the oil relief valve when the piston is in a position to close the air release valve, and means for returning the piston to a position to open the air release valve when the oil pressure drops due to stopping of the wheel driving the pump, said oil pump comprising a casing, a gear positioned therein, a pair of pinions positioned therein on opposite sides of said gear and meshing therewith, said casing being divided into three compartments by said meshing gear and pinions, a passage for feeding oil from said reservoir to one of the compartments serving as an inlet, passages leading from the discharge compartments to a duct communicating with the oil cylinder, and means for closing the passage from one discharge compartment when the other is discharging oil under pressure.

6. An apparatus for avoiding skidding or sliding of car wheels controlled by air brakes by releasing air from a brake cylinder when a wheel controlled thereby is stopped, comprising a valve for controlling the release of air from the brake cylinder, a cylinder, a piston slidably mounted therein, means carried by the piston for opening and closing said valve as the piston moves from one end of its travel to the other, an oil pump operated by the brake controlled wheel, a reservoir for supplying oil to said pump, the discharge of said pump being connected to said cylinder so that oil under pressure from said pump will move the piston to a position to close the air release valve, a relief valve in the head of said piston adapted to bleed a portion of the oil therethrough, means for opening the oil relief valve when the piston is in a position to close the air release valve, and means for returning the piston to a position to open the air release valve when the oil pressure drops due to stopping of the wheel driving the pump, said oil pump comprising a casing containing three gears arranged to provide a double acting gear pump having a single intake compartment and two discharge compartments, one of which is operative in one direction of rotation of the gears and the other in the opposite direction of rotation, and passages leading from both of the discharge chambers through an oscillating valve to a single discharge duct.

7. An apparatus for avoiding skidding or sliding of car wheels controlled by air brakes by releasing air from a brake cylinder when a wheel controlled thereby is stopped, comprising a valve for controlling the release of air from the brake cylinder, a cylinder, a piston slidably mounted therein, means carried by the piston for opening and closing said valve as the piston moves from one end of its travel to the other, an oil pump operated by the brake controlled wheel, a reservoir for supplying oil to said pump, the discharge of said pump being connected to said cylinder so that oil under pressure from said pump will move the piston to a position to close the air release valve, a relief valve in the head of said piston adapted to bleed a portion of the oil therethrough, a rod for actuating the oil relief valve, an adjustable abutment for engaging the rod to open the oil relief valve as the piston reaches a position to close the air release valve, and a spring for urging the piston to a position to open the air release valve.

8. An apparatus for avoiding skidding or sliding of car wheels controlled by air brakes by releasing air from a brake cylinder when a wheel controlled thereby is stopped, comprising a valve for controlling the release of air from the brake cylinder, a cylinder, a piston slidably mounted therein, means carried by the piston for opening and closing said valve as the piston moves from one end of its travel to the other, an oil pump operated by the brake controlled wheel, a reservoir for supplying oil to said pump, the discharge of said pump being connected to said cylinder so that oil under pressure from said pump will move the piston to a position to close the air release valve, a relief valve in the head of said piston adapted to bleed a portion of the oil therethrough, a rod for actuating the oil relief valve, an adjustable abutment for engaging the rod to open the oil relief valve as the piston reaches a position to close the air release valve, a spring for urging the piston to a position to open the air release valve, and spring-controlled means for retaining the oil relief valve open after the rod has been moved out of engagement with the abutment.

9. An apparatus for avoiding skidding or sliding of car wheels controlled by air brakes by releasing air from a brake cylinder when a wheel controlled thereby is stopped, comprising a valve for controlling the release of air from the brake cylinder, a cylinder, a piston slidably mounted therein, means carried by the piston for opening and closing said valve as the piston moves from one end of its travel to the other, an oil pump operated by the brake controlled wheel, a reservoir for supplying oil to said pump, the discharge of said pump being connected to said cylinder so that oil under pressure from said pump will move the piston to a position to close the air release valve, a relief valve in the head of said piston adapted to bleed a portion of the oil therethrough, a rod for actuating the oil relief valve, an adjustable abutment for engaging the rod to open the oil relief valve as the piston reaches a position to close the air release valve, a spring for urging the piston to a position to open the air release valve, and spring-controlled means for retaining the oil relief valve open after the rod has been moved out of engagement with the abutment until the oil relief valve is closed by being moved into engagement with the oil inlet end of the cylinder.

ALFONSO GARCIA.